United States Patent
Natsumeda et al.

(10) Patent No.: US 9,110,357 B2
(45) Date of Patent: Aug. 18, 2015

(54) DISPLAY ELEMENT, DISPLAY DEVICE, AND PROJECTION DISPLAY DEVICE

(75) Inventors: Masanao Natsumeda, Tokyo (JP); Masao Imai, Tokyo (JP); Shin Tominaga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 199 days.

(21) Appl. No.: 13/697,650

(22) PCT Filed: May 13, 2011

(86) PCT No.: PCT/JP2011/061046
§ 371 (c)(1),
(2), (4) Date: Nov. 13, 2012

(87) PCT Pub. No.: WO2011/142456
PCT Pub. Date: Nov. 17, 2011

(65) Prior Publication Data
US 2013/0057938 A1    Mar. 7, 2013

(30) Foreign Application Priority Data
May 14, 2010   (JP) .................... 2010-112072

(51) Int. Cl.
*G02B 26/02* (2006.01)
*G03B 21/00* (2006.01)
(Continued)

(52) U.S. Cl.
CPC ............. *G03B 21/00* (2013.01); *G02B 5/008* (2013.01); *G02B 26/02* (2013.01); *G03B 21/14* (2013.01);
(Continued)

(58) Field of Classification Search
CPC ........ B82Y 20/00; H04N 9/3197; G02F 1/01; G02F 1/035; G02F 1/0525; G02F 1/1333; G02F 1/13334; G02F 1/1347; G02F 2203/10
See application file for complete search history.

(56) References Cited

U.S. PATENT DOCUMENTS

2004/0206969 A1   10/2004   Orita
2006/0187528 A1   8/2006    Hagood et al.
(Continued)

FOREIGN PATENT DOCUMENTS

CN       101371177 A    2/2009
JP       2005-005679 A  1/2005
(Continued)

OTHER PUBLICATIONS

Office Action, dated Apr. 1, 2014, issued by the State Intellectual Property Office of the People's Republic of China, in counterpart Application No. 201180024087.
(Continued)

*Primary Examiner* — Ricky Mack
*Assistant Examiner* — Robert E Tallman
(74) *Attorney, Agent, or Firm* — Sughrue Mion, PLLC

(57) ABSTRACT

The present invention includes light valve section (10) having substrate (22) through which light that exits plurality of optical connection mechanisms (23) that switch between the transmitting state and the shading state of light emitted from light emitting element (25) transmits and plasmon coupling section (11) that is arranged in light valve section (10) and that causes plasmon coupling to occur with light that exits light emitting element (25). Plasmon coupling section (11) includes carrier generation layer (15) that generates carriers with light that exits light emitting element (25) and plasmon excitation layer (17) that has a higher plasma frequency than the frequency of light that is generated in carrier generation layer (15) excited with the light emitted from light emitting element (25). Wave number vector conversion layer (19) is arranged on substrate (22). Wave number vector conversion layer (19) converts the light or surface plasmons generated in plasmon excitation layer (17) into light having a predetermined exit angle. Plasmon excitation layer (17) is sandwiched between first dielectric constant layer (16) and second dielectric constant layer (18).

15 Claims, 11 Drawing Sheets

(51) Int. Cl.
  *G02B 5/00* (2006.01)
  *G03B 21/14* (2006.01)
  *H04N 5/74* (2006.01)
  *H04N 9/31* (2006.01)
  *G03B 21/20* (2006.01)
  *F21V 8/00* (2006.01)

(52) U.S. Cl.
  CPC .......... *G03B 21/204* (2013.01); *G03B 21/2066* (2013.01); *H04N 5/74* (2013.01); *H04N 9/31* (2013.01); *H04N 9/3152* (2013.01); *G02B 6/005* (2013.01); *G02B 6/0038* (2013.01); *G02B 6/0075* (2013.01)

(56) References Cited

U.S. PATENT DOCUMENTS

2008/0174519 A1* 7/2008 Shieh et al. ................. 345/55
2011/0109845 A1* 5/2011 Tang et al. ................. 349/88

FOREIGN PATENT DOCUMENTS

| JP | 2006-313667 | A | 11/2006 |
| JP | 2008-532069 | A | 8/2008 |
| JP | 2009-524850 | A | 7/2009 |
| WO | 2006/091904 | A2 | 8/2006 |
| WO | 2007/120949 | A2 | 10/2007 |
| WO | 2011/040528 | A1 | 4/2011 |

OTHER PUBLICATIONS

Ehren Hwang, et al., "Surface Plasmon Polariton Enhanced Fluorescence from Quantum Dots on Nanostructured Metal Surfaces", NANO Letters, Mar. 10, 2010, pp. 813-820, vol. 10, No. 3.

Christian Hoepfner, Invited Paper: PhlatLight™ "Photonic Lattice LEDs for RPTV Light Engines", SID Symposium Digest 37, 2006, p. 1808.

* cited by examiner

DISPLAY ELEMENT, DISPLAY DEVICE, AND PROJECTION DISPLAY DEVICE

CROSS REFERENCE TO RELATED APPLICATIONS

This application is a National Stage of International Application No. PCT/JP2011/061046 filed May 13, 2011, claiming priority based on Japanese Patent Application No. 2010-112072 filed May 14, 2010, the contents of all of which are incorporated herein by reference in their entirety.

TECHNICAL FIELD

The present invention relates to a display element, a display device, and a projection display device that use surface plasmons to emit light.

BACKGROUND ART

A projector having solid state light source that uses a light emitting element such as a light emitting diode (LED) or a semiconductor laser (LD) as a light source has been proposed. A projector having solid state light source of this type has an illumination optical system into which light emitted from the light emitting element enters; a light valve having a display element such as a liquid crystal display panel that light that exits the illumination optical system enters or a DMD (Digital Micromirror Device); and a projection optical system that projects light that exits the light valve to a projection plane.

A requirement for the projector, having a solid state light source, is that there be a minimum of optical loss in the optical path from the light emitting element to the light valve so as to improve the luminance of projected images.

In addition, as described in Non-Patent Literature 1, such a projector having a solid state light source is restricted by the etendue that depends on the product of the area and emission angle of the light source. In other words, light emitted from the light source cannot be used as projection light unless the product of the light emission area and emission angle of the light source is equal to or smaller than the product of the area of the incident plane of the light valve and the acceptance angle (solid angle) that depends on the F number of the optical system.

Thus, there has been a demand to reduce the etendue of light emitted from the light emitting element so as to reduce the foregoing optical loss.

Projectors having a solid state light source for business use and home theaters need to emit a light beam in the order of several thousand lumens. Thus, such projectors having a solid state light source need to improve the light use efficiency of light emitted from the light emitting element and realize high luminance and high directivity.

As an example of a display element having a light source with an improved light use efficiency, as shown in FIG. 1, a spatial optical modulator that has an MEMS (Micro Electro Mechanical Systems) shutter mechanism that selectively shades incident light emitted from light source 1204 has been disclosed (refer to Patent Literature 1). This display element has light source 1204; optical cavity 1202 that light 1214 emitted from light source 1204 enters; optical modulation array 1206 that modulates light 1214 that exits optical cavity 1202; and cover plate 1207 that covers optical modulation array 1206.

Optical cavity 1202 has optical guide 1208; and substrate 1210 arranged on optical guide 1208 with air gap 1213. Formed on optical guide 1208 is rear reflection plane 1212 including light scattering elements 1209. Optical modulation array 1206 has light transmitting regions 1222 into which light that exits optical cavity 1202 enters; and an MEMS shutter mechanism including shutters 1110 that can open and close light transmitting regions 1222. Cover plate 1207 has light transmitting regions 1114 through which light 1214 that has passed through light transmitting regions 1222 of optical modulation array 1206 passes. In this display element, light 1214 is multiply reflected between shutters 1110 and optical cavity 1202, reuses light 1214, and causes it to pass through light transmitting regions 1222. As a result, the display element improves the light use efficiency of light source 1204.

PATENT LITERATURE

Patent Literature 1: JP2008-532069A, Publication (translation version)

NON-PATENT LITERATURE

Non-Patent Literature 1: PhlatLight TM Photonic Lattice LEDs for RPTV Light Engines; Christine Hoepiher; SID Symposium Digest 37, 1808 (2006)

SUMMARY OF INVENTION

As described above, in the projector having a solid state light source, light emitted from a light valve at a predetermined emission angle or more (for example, an emission angle of ±15°) does not enter the projection optical system, but becomes optical loss. In the structure presented in Patent Literature 1, the directivity of light that exits the light valve depends on the directivity of light that exits the illumination optical system and then enters the light valve. Thus, in the structure presented in Patent Literature 1, when a light emitting element that emits a light beam in the order of several thousand lumens is used as a light source, high luminance can be achieved. However, it is difficult to narrow the emission angle of light emitted from the display element to less than ±15°. In other words, the display element presented in Patent Literature 1 has a drawback of improper directivity of light that is emitted.

In other words, the structure disclosed in Patent Literature 1 can not realize a display element that satisfies both luminance and directivity that an ordinary projector needs.

An object of the present invention is to provide a display element, a display device, and a projection display device that can solve the forgoing engineering problems.

To realize the foregoing object, a display element according to the present invention includes a light valve section having a plurality of optical shutter means that switch between a transmitting state and a shading state of light emitted from a light emitting element; and a substrate through which light that exits the plurality of optical shutter means is transmitted. The display element also includes a plasmon coupling section that is arranged in the light valve section and that causes plasmon coupling to occur with light that exits the light emitting element. The plasmon coupling section includes a carrier generation layer that generates carriers with light that exits the light emitting element, and a plasmon excitation layer that is stacked above the carrier generation layer and that has a higher plasma frequency than the frequency of light that is generated in the carrier generation layer excited with the light emitted from the light emitting element. An exit layer is arranged on the substrate or between the substrate and the plasmon excitation layer so as to convert the light or surface plasmons generated in the plasmon excitation layer into light having a predetermined exit angle. The plasmon excitation layer is sandwiched between two layers having dielectric constants.

A display device according to the present invention includes a display element of the present invention and at least one light emitting element.

A projection display device according to the present invention includes a display device of the present invention and a projection optical system that projects a projection image with light that exits the display device.

According to the present invention, since both luminance and directivity of light that is emitted can be satisfied, a display element that has high luminance and high directivity can be realized.

DESCRIPTION OF EMBODIMENTS

Next, with reference to the accompanying drawings, embodiments of the present invention will be described.

First Embodiment

Figure 1:
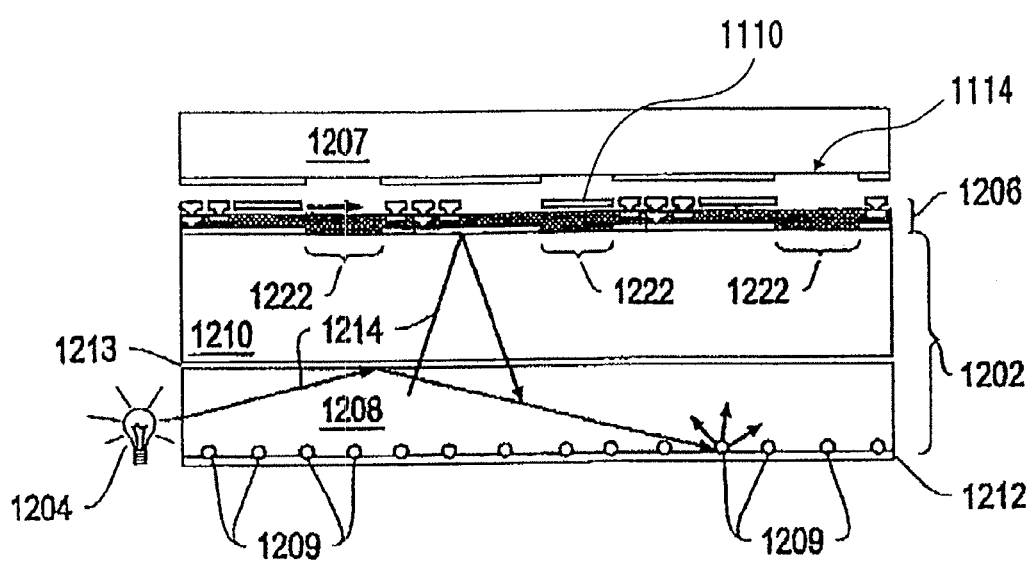
FIG. 1 is a sectional view describing the structure presented in Patent Literature 1.
Figure 2:
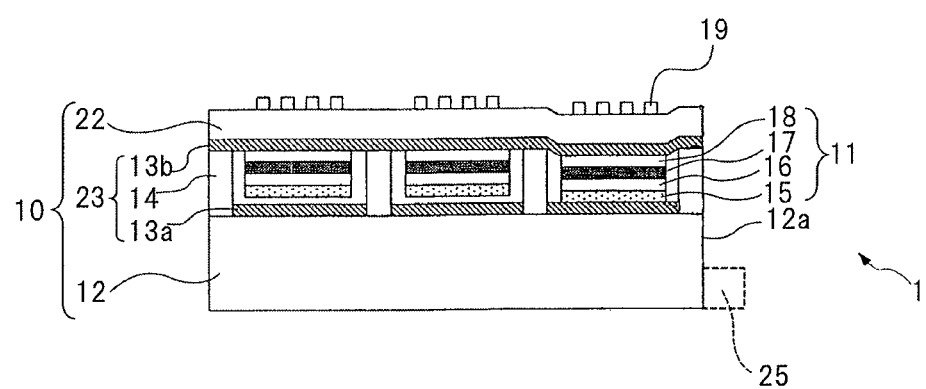
FIG. 2 is a sectional view schematically showing a display element according to a first embodiment.

FIG. 2 is a sectional view schematically showing a display element according to a first embodiment of the present invention. Since the individual layers of the display element are very thin and their thickness largely differs, it is difficult to illustrate the individual layers in exact scale. Thus, the drawings do not illustrate the individual layers in exact scale, but schematically illustrate them.

As shown in FIG. 2, display element 1 according to this embodiment has light valve section 10 including a plurality of optical connection mechanisms 23 as a plurality of optical shutter means that switch between a transmitting state and a shading state of light emitted from light emitting element 25 and substrate 22 through which light that exits the plurality of optical connection mechanism 23 is transmitted. In addition, display element 1 has a plurality of plasmon coupling sections 11 that cause plasmon coupling to occur with light that exits light emitting element 25 arranged in light valve section 10. Display element 1 also has wave number vector conversion layer 19 as an exit layer that is stacked on substrate 22 of light valve section 10 and that converts a wave number vector of light generated in plasmon coupling section 11 into light having a predetermined exit angle and then light exits therefrom.

Light valve section 10 has light conductor 12 into which light emitted from light emitting element 25 enters; the plurality of optical connection mechanisms 23 arranged at a position corresponding to light that exits light conductor 12;

and substrate 16 arranged above the plurality of plasmon coupling sections 11 that are two-dimensionally arranged as pixels.

As shown in FIG. 2, a plurality of structural members such as micro-prisms or scattering members that control luminous intensity properties may be arranged on a bottom plane of light conductor 12 on the opposite side of plasmon coupling sections 11. Alternatively, light conductor 12 may have a light diffusion plate (not shown) arranged on the foregoing bottom plane or contain dispersed scattering members (not shown).

As shown in FIG. 2, optical connection mechanisms 23 are arranged between substrate 22 and light conductor 12. Optical connection mechanism 23 has spacers 44 that form a space between substrate 22 and light conductor 12; and a pair of transparent electrodes 13*a* and 13*b* that move the plurality of plasmon coupling sections 11 secured to substrate 22. Optical connection mechanism 23 is for example a so-called TMOS (Time Multiplexed Optical Shutter).

Figure 3:
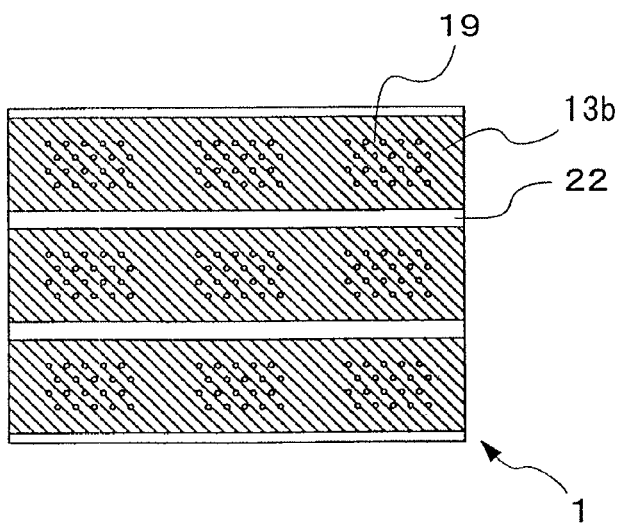
FIG. 3 is a plan view schematically showing the display element according to the first embodiment.
Figure 4:
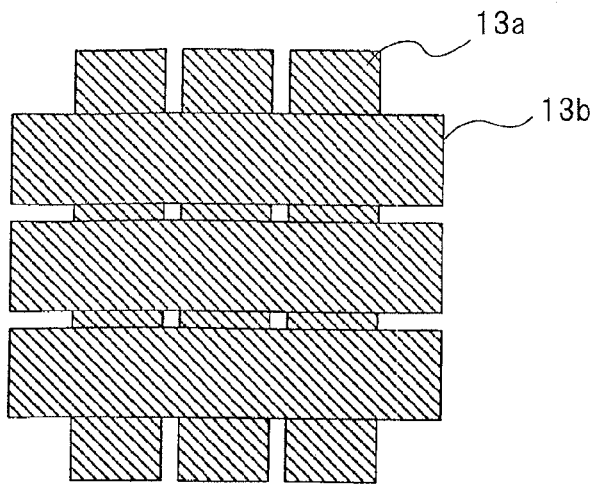
FIG. 4 is a perspective plan view showing a pair of transparent electrodes of the display element according to the first embodiment.

FIG. 3 is a plan view showing display element 1. FIG. 4 is a perspective plan view showing a pair of transparent electrodes 13*a* and 13*b* of display element 1.

As shown in FIG. 2, spacers 14 are arranged between plasmon coupling sections 11 that comprise individual pixels. It is preferable that spacers 14 be made of a material that is transparent to visible light.

The pair of transparent electrodes 13*a* and 13*b* are arranged such that they sandwich plasmon coupling sections 11. One transparent electrode 13*a* is arranged in a stripe shape on light conductor 12. As shown in FIG. 3, the other transparent electrode 13*b* is arranged in a stripe shape immediately below substrate 22. As shown in FIG. 4, transparent electrodes 13*a* and 13*b* are arranged in stripe shapes such that they are orthogonal to each other.

Plasmon coupling sections 11 according to this embodiment are secured below substrate 22. Transparent electrode 13*b* is arranged between substrate 22 and plasmon coupling sections 11. Clearance is made between carrier generation layer 15 (that will be described later) of plasmon coupling sections 11 and transparent electrode 13*a*.

In optical connection mechanism 23, when a voltage is applied between the pair of transparent electrodes 13*a* and 13*b*, electrostatic force occurs therebetween and thereby transparent electrode 13*b* and substrate 22 are deformed. When transparent electrode 13*b* and substrate 22 are deformed, plasmon coupling section 11 moves between a first position at which light emitted from light emitting element 25 passes through substrate 22 and a second position at which light emitted from light emitting element 25 does not pass through substrate 22. When plasmon coupling section 11 moves to the first position, carrier generation layer 15 of plasmon coupling section 11 makes contact with transparent electrode 13*a*. Thus, desired plasmon coupling section 21 arranged below substrate 22 is optically connected to light conductor 12.

According to this embodiment, transparent electrode 13*b* is arranged on the bottom plane of substrate 22 opposite to light conductor 12. Alternatively, transparent electrode 13*b* may be arranged on an exit side plane of substrate 22. However, with respect to a drive voltage of optical connection mechanism 23, when the distance between the pair of transparent electrodes 13*a* and 13*b* is decreased in the structure according to this embodiment, the power consumption can be reduced. Thus, it is preferable that transparent electrode 13*b* be arranged on the bottom plane of substrate 22.

The plurality of plasmon coupling sections 11 are arranged in a matrix shape between substrate 22 and light conductor 12 in light valve section 10 such that the plurality of plasmon coupling sections 11 comprise pixels. Likewise, the plurality of optical connection mechanisms 23 are arranged corresponding to pixels that are composed of the plurality of plasmon coupling sections 11. In other words, FIG. 2 shows plasmon coupling sections 11 that comprise three pixels. The inside of each pixel, namely the regions surrounded by spacers 14, may be filled with an inertia gas such as nitrogen gas or argon gas. Plasmon coupling sections 11 may be applied to any transmission type light valve having any structure.

As shown in FIG. 2, plasmon coupling sections 11 each have carrier generation layer 15 that generates carriers with part of light that exits light conductor 12; and plasmon excitation layer 17 that is stacked on carrier generation layer 15 and that has a higher plasma frequency than the frequency of light that is generated in carrier generation layer 15 excited with light emitted in light emitting element 25.

In addition, plasmon coupling sections 11 each have first dielectric constant layer 16 sandwiched between carrier generation layer 15 and plasmon excitation layer 17; and second dielectric constant layer 18 sandwiched between plasmon excitation layer 17 and transparent electrode 13*b*. Second dielectric constant layer 18 has a higher dielectric constant than first dielectric constant layer 16.

According to this embodiment, one light emitting element 25 is arranged on light incident plane 12*a* that is one side plane of planar light conductor 12. Light emitting element 25 may be composed of for example a light emitting diode (LED), a laser diode, or a super luminescent diode that emits light having a wave length that carrier generation layer 15 can absorb. In addition, light emitted from light emitting element 25 is light having a frequency that can excite carrier generation layer 15. Light emitted from light emitting element 25 is, for example, ultraviolet light or blue light having a short wave length. If a plurality of types of carrier generation layers 15 are arranged, a plurality of types of light emitting elements 25 that emit light having different frequencies that can excite carrier generation layers 15 may be used. Light emitting element 25 may be arranged apart from light incident plane 12*a* of light conductor 12. In this case, light emitting element 25 may be optically connected to light conductor 12 with a light conductor such as a light pipe. Alternatively, a plurality of light emitting elements 25 may be arranged along a plurality of side planes of light conductor 12. Further alternatively, a plurality of light emitting elements 25 may be arranged along a bottom plane of light conductor 12 on the opposite side of plasmon coupling section 11.

According to this embodiment, light conductor 12 is formed in a planar shape. However, the shape of light conductor 12 is not limited to a rectangular parallelepiped shape. Alternatively, light conductor 12 may be formed in another shape such as a wedge shape. A reflection film may be formed entirely or partly on the outer circumferential plane of light conductor 12 excluding light incident plane 12*a*. The reflection film may be made of, for example, a metal material such as silver or aluminum or a dielectric constant laminate film.

Carrier generation layer 15 is made of an organic fluorescent substance such as rhodamine 6G or sulforhodamine 101; a quantum dot fluorescent substance such as CdSe or CdSe/ZnS quantum dots; an inorganic material such as GaN or GaAs (semiconductor); or an organic material such as (thiophene/phenylene) co-oligomer or Alq3 (semiconductor material). When a fluorescent substance is used, a plurality of fluorescent substances having the same light emission frequency or different light emission frequencies may be contained in carrier generation layer 15. It is preferable that the thickness of carrier generation layer 15 be 1 μm or less.

When plasmon coupling sections 11 correspond to R (red), G (green), and B (blue) pixels, carrier generation layer 15 corresponding to R, G, and B pixels may be made of different materials. When plasmon coupling sections 11 correspond to single-color pixels (for example R), carrier generation layer 15 corresponding to individual pixels may be made of the same material. In this case, the plurality of plasmon coupling sections 11 do not need to be separated corresponding to individual pixels, but be integrally formed together.

Plasmon excitation layer 17 is a fine particle layer or a thin film layer made of a material having a plasma frequency higher than the frequency of light that is generated in carrier generation layer 15 excited with light emitted from light emitting element 25 (light emission frequency). In other words, plasmon excitation layer 17 has a negative dielectric constant at the light emission frequency of light generated in carrier generation layer 15 excited with light emitted in light emitting element 25.

Examples of the material of plasmon excitation layer 17 include gold, silver, copper, platinum, palladium, rhodium, osmium, ruthenium, iridium, iron, tin, zinc, cobalt, nickel, chromium, titanium, tantalum, tungsten, indium, aluminum, and an alloy thereof. Among them, it is preferable that the material of plasmon excitation layer 17 be gold, silver, copper, platinum, aluminum, or an alloy that contains one of these metals as a primary component. It is more preferable that the material of plasmon excitation layer 17 be gold, silver, aluminum, or an alloy containing one of these metals as a primary component. It is preferable that plasmon excitation layer 17 be formed with a thickness of 200 nm or less. It is more preferable that plasmon excitation layer 17 be formed with a thickness in the approximate range from 10 nm to 100 nm.

When the plurality of plasmon coupling sections 11 correspond to R, G, and B pixels, plasmon excitation layers 17 that correspond to these pixels may be made of different materials. At this point, it is preferable that plasmon excitation layer 17 that corresponds to R pixels be made of gold or an alloy containing gold as a primary component; plasmon excitation layer 17 that corresponds to G pixels be made of gold, silver, or an alloy containing gold or silver as a primary component; and plasmon excitation layer 17 that corresponds to B pixels be made of silver or an alloy containing silver as a primary component. If necessary, plasmon excitation layer 17 and carrier generation layer 15 may be integrally formed together such that R, G, and B pixels are continuously formed. If the plurality of plasmon coupling sections 11 correspond to single-color pixels, plasmon excitation layers 17 that correspond to individual pixels may be made of the same material.

Display element 1 according to this embodiment is structured such that the effective dielectric constant of an incident side portion including the entire structure that has first dielectric constant layer 16 stacked on carrier generation layer 15 side of plasmon excitation layer 17 and light conductor 12 (hereinafter simply referred to as the incident side portion) is higher than that of an exit side portion including the entire structure that has second dielectric constant layer 18 stacked on wave number vector conversion layer 19 side of plasmon excitation layer 17, substrate 22, wave number vector conversion layer 19, and a medium that contacts wave number vector conversion layer 19 (hereinafter simply referred to as the exit side portion). The entire structure stacked on carrier generation layer 15 side of plasmon excitation layer 17 includes first dielectric constant layer 16, carrier generation layer 15, and transparent electrode 13a. The entire structure stacked on wave number vector conversion layer 19 side of plasmon excitation layer 17 includes second dielectric constant layer 18, transparent electrode 13b, substrate 22, and wave number vector conversion layer 19.

In other words, according to the first embodiment, the effective dielectric constant of the incident side portion including transparent electrode 13a, carrier generation layer 15, and first dielectric constant layer 16 with respect to plasmon excitation layer 17 is higher than that of the exit side portion including second dielectric constant layer 18, transparent electrode 13b, substrate 22, wave number vector conversion layer 19 and the medium contacting wave number vector conversion layer 19 with respect to plasmon excitation layer 17.

Specifically, the real part of the complex effective dielectric constant of the incident side portion (carrier generation layer 15 side) of plasmon excitation layer 17 is set to be lower than the real part of the complex effective dielectric constant of the exit side portion (wave number vector conversion layer 19 side) of plasmon excitation layer 17.

Now, the complex dielectric constant of first dielectric constant layer 16 is denoted by $\epsilon_l(\lambda_o)$, the real part thereof is denoted by $\epsilon_{lr}(\lambda_o)$, the imaginary part thereof is denoted by $\epsilon_{li}(\lambda_o)$, the complex dielectric constant of second dielectric constant layer 18 is denoted by $\epsilon_h(\lambda_o)$, the real part thereof is denoted by $\epsilon_{hr}(\lambda_o)$, and the imaginary part thereof is denoted by $\epsilon_{hi}(\lambda_o)$, then the relationship of $1 \leq \epsilon_{lr}(\lambda_o) < \epsilon_{hr}(\lambda_o)$ is satisfied where $\lambda_o$ is the wavelength in vacuum of light that enters the first (second) dielectric constant layer.

It is preferable that imaginary part $\epsilon_{li}(\lambda_o)$ and imaginary part $\epsilon_{hi}(\lambda_o)$ of the frequency of emission light be as low as possible so as to cause plasmon coupling to easily occur and reduce optical loss.

Likewise, it is preferable that real part $\epsilon_{lr}(\lambda_o)$ of first dielectric constant layer 16 be as low as possible. Since the angle of light that enters wave number vector conversion layer 19 can be decreased, light that is emitted can be effectively extracted from display element 1. In contrast, it is preferable that real part $\epsilon_{hr}(\lambda_o)$ of second dielectric constant layer 18 be as high as possible. Since the angle of light that enters wave number vector conversion layer 19 can be decreased, light that is emitted can be effectively extracted from display element 1. Hereinafter, unless otherwise specified, the dielectric constant represents the real part of the complex effective dielectric constant of the frequency of light that is emitted.

Assuming that directions in parallel with an interface of plasmon excitation layer 17 are denoted by x and y axes; a direction perpendicular to the interface of plasmon excitation layer 17 is denoted by z axis; an angular frequency of light that exits carrier generation layer 15 is denoted by w; a dielectric constant distribution of a dielectric substance at the incident side portion and exit side portion with respect to plasmon excitation layer 17 is denoted by $\epsilon(\omega, x, y, z)$; a z component of the wave number of surface plasmons is denoted by $k_{spp,z}$; and an imaginary unit is denoted by j, then complex effective dielectric constant $\epsilon_{eff}$ can be expressed as follows.

[Formula 1]

$$\varepsilon_{eff} = \frac{\iint_D \int \varepsilon(\omega, x, y, z) \exp(2jk_{spp,z}z)}{\iint_D \int \exp(z)} \qquad \text{Formula (1)}$$

Integration range D is a range of the incident side portion or exit side portion in a three dimensional coordination with respect to plasmon excitation layer 17. In other words, the ranges in the directions of the x axis and y axis in integration range D are ranges that do not include a medium on the outer circumferential plane of the structure that the incident side portion or exit side portion includes, but are ranges that include the outer edge of a plane in parallel with the interface of plasmon excitation layer 17. On the other hand, the range in the direction of the z axis in integration range D is the range of the incident side portion or exit side portion (including the medium). It is assumed that the interface between plasmon excitation layer 17 and a layer adjacent thereto is at the position where z=0, that the range in the direction of the z axis in integration range D is a range from the interface to infinity on the foregoing adjacent layer side of plasmon excitation layer 17, and that the direction that is apart from the interface is referred to as the (+) z direction in Formula (1).

On the other hand, assuming that the real part of the dielectric constant of plasmon excitation layer 17 is denoted by $\varepsilon_{metal}$ and the wave number of light in vacuum is denoted by $k_o$, a z component of the wave number of surface plasmons, $k_{spp,\,z}$, and $x$ and $y$ components of the wave number of the surface plasmons, $k_{spp}$, can be expressed as follows.

[Formula 2]

$$k_{spp,z} = \sqrt{\varepsilon_{\mathit{eff}} k_0^2 - k_{spp}^2} \quad \text{Formula (2)}$$

[Formula 3]

$$k_{spp} = k_0 \sqrt{\frac{\varepsilon_{\mathit{eff}}\, \varepsilon_{metal}}{\varepsilon_{\mathit{eff}} + \varepsilon_{metal}}} \quad \text{Formula (3)}$$

Thus, by substituting dielectric constant distribution $\varepsilon_{in}$ ($\omega$, x, y, z) of the incident side portion of plasmon excitation layer 17 and dielectric constant distribution $\varepsilon_{out}$ ($\omega$, x, y, z) of the exit side portion of plasmon excitation layer 17 as $\varepsilon$ ($\omega$, x, y, z) into Formula (1), Formula (2), and Formula (3), complex effective dielectric constant layer $\varepsilon_{\mathit{effin}}$ of the incident side portion with respect to plasmon excitation layer 17 and complex effective dielectric constant $\varepsilon_{\mathit{effout}}$ of the exit side portion with respect to plasmon excitation layer 17 are obtained. In practice, by giving an appropriate initial value as complex effective dielectric constant $\varepsilon_{\mathit{eff}}$ and iteratively calculating Formula (1), Formula (2) and Formula (3), complex effective dielectric constant $\varepsilon_{\mathit{eff}}$ can be easily obtained.

Assuming that an effective interaction distance of surface plasmons is a distance for which the intensity of surface plasmons becomes $e^{-2}$, effective interaction distance $d_{\mathit{eff}}$ of the surface plasmons can be expressed as follows.

[Formula 4]

$$d_{\mathit{eff}} = \text{Im}\left[\frac{1}{k_{spp,z}}\right] \quad \text{Formula (4)}$$

It is preferable that the imaginary part of the complex dielectric constant of any layer including light conductor 12 (excluding carrier generation layer 15 and plasmon excitation layer 17) and a medium that makes contact with wave number vector conversion layer 19 be as small as possible. When the imaginary part of the complex dielectric constant is set to be as small as possible, plasmon coupling is managed to easily occur so as to reduce optical loss.

The ambient medium of plasmon coupling sections 11, namely the medium that makes contact with light conductor 12 and wave number vector conversion layer 19, may be either solid, liquid, or gaseous. In addition, the ambient medium on light conductor 12 side may be different from that on wave number vector conversion layer 19 side.

It is preferable that first dielectric constant layer 16 be, for example, $SiO_2$ nano-rod array film or a thin film or a porous film of $SiO_2$, $AlF_3$, $MgF_2$, $Na_3AlF_6$, NaF, LiF, $CaF_2$, $BaF_2$, or a low dielectric constant plastic.

It is preferable that second dielectric constant layer 18 be a high dielectric constant material such as diamond, $TiO_2$, $CeO_2$, $Ta_2O_5$, $ZrO_2$, $Sb_2O_3$, $HfO_2$, $La_2O_3$, $NdO_3$, $Y_2O_3$, ZnO, or $Nb_2O_5$.

As shown in FIG. 2, wave number vector conversion layer 19 is arranged on substrate 22. As shown in FIG. 3, wave number vector conversion layer 19 is arranged opposite to stripe shaped transparent electrode 13b. In other words, wave number vector conversion layer 19 according to this embodiment is arranged partly on the exit side plane of substrate 22, namely at a position corresponding to plasmon coupling sections 11. If necessary, wave number vector conversion layer 19 may be formed entirely on the exit side plane of substrate 22.

Wave number vector conversion layer 19 is an exit layer on which a wave number vector of light that enters wave number vector conversion layer 19 is converted, light is extracted from substrate 22 through second dielectric constant layer 18, and then the light is emitted from display element 1. In other words, wave number vector conversion layer 19 converts the exit angle of light that exits substrate 22 into a predetermined angle such that display element 1 emits light having the converted angle. Namely, wave number vector conversion layer 19 causes display element 1 to emit light in a direction nearly orthogonal to the interface with substrate 22.

Wave number vector conversion layer 19 has, for example, a surface relief grating; a periodic structure typified by photonic crystal; a quasi-periodic structure; one of these structures that contain defects; a texture structure having a wavelength higher than that of light emitted from display element 1; an uneven surface structure; a hologram; or a micro lens array. The quasi-periodic structure represents a quasi-crystalline structure that is a special coherent structure having five symmetries or ten symmetries that are not permitted for crystals. Among them, it is preferable that wave number vector conversion layer 19 be a periodic structure typified by photonic crystal, a quasi-periodic structure, one of these structures containing defects, or a micro lens array. They can not only improve light extraction efficiency, but also control the directivity. When wave number vector conversion layer 19 is photonic crystal, it is preferable that it have a triangular grating crystalline structure. Wave number vector conversion layer 19 may be formed in such a manner that a periodic convex structure or a periodic concave structure is formed on a planar substrate.

FIG. 5A to FIG. 5F show a manufacturing process for plasmon coupling sections 11 of display element 1. The manufacturing process shown in these drawings is just an example and therefore the present invention is not limited thereto. Since light valve section 10 in which plasmon coupling sections 11 are formed is a known transmission type light valve, the description of the manufacturing process for light valve section 10 will be omitted.

Figure 5A:
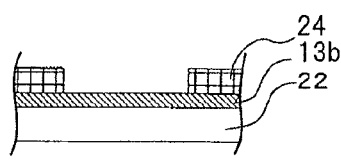
FIG. 5A is a sectional view describing a manufacturing method for the plasmon coupling sections of the display element according to the first embodiment.

First, as shown in FIG. 5A, transparent electrode 13b is formed in a stripe shape on substrate 22 of light valve section 10 and then resist film 24 is coated on transparent electrode 13b using spin coat technique. Thereafter, part of resist film 29 is removed from a portion for plasmon coupling sections 11 corresponding to pixels using electron beam, photolithography, print, or similar technique.

Figure 5B:
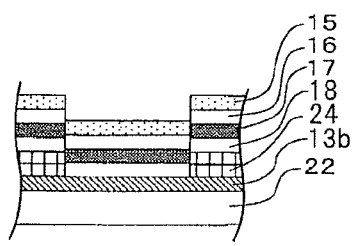
FIG. 5B is a sectional view describing the manufacturing method for the plasmon coupling sections of the display element according to the first embodiment.

Thereafter, as shown in FIG. 5B, second dielectric constant layer 18, plasmon excitation layer 17, first dielectric constant layer 16, and carrier generation layer 15 are successively stacked on substrate 22.

Figure 5C:
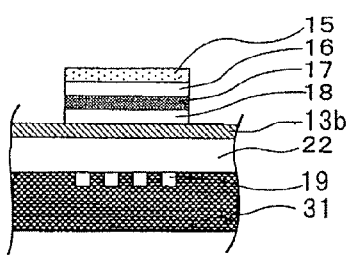
FIG. 5C is a sectional view describing the manufacturing method for the plasmon coupling sections of the display element according to the first embodiment.

Thereafter, as shown in FIG. 5C, mold 31 having a cavity coated with a mold release agent is prepared. Thereafter, the cavity of mold 31 is filled with an ultraviolet curing resin that forms wave number vector conversion layer 19. The opposite plane of plasmon coupling section 11 side of substrate 22 is placed on mold 31 and then the ultraviolet curing resin is cured with ultraviolet light. As a result, wave number vector conversion layer 19 is formed on substrate 22.

Figure 5D:
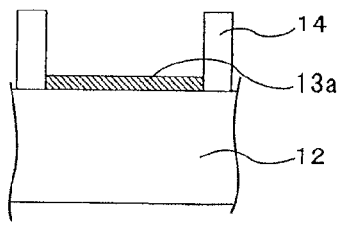
FIG. 5D is a sectional view describing the manufacturing method for the plasmon coupling sections of the display element according to the first embodiment.
Figure 5E:
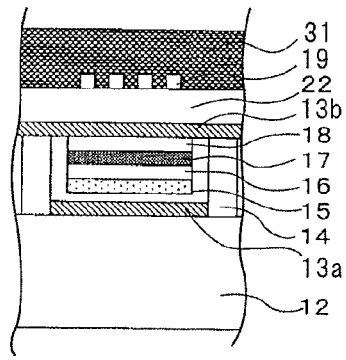
FIG. 5E is a sectional view describing the manufacturing method for the plasmon coupling sections of the display element according to the first embodiment.
Figure 5F:
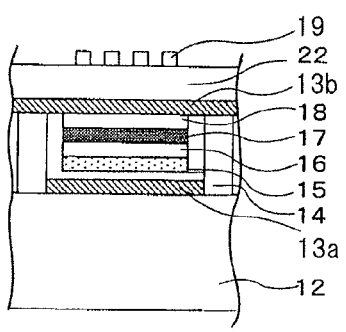
FIG. 5F is a sectional view describing the manufacturing method for the plasmon coupling sections of the display element according to the first embodiment.

Thereafter, as shown in FIG. 5D, transparent electrode 13a is formed in a stripe shape on light conductor 12 such that transparent electrode 13a is orthogonal to transparent electrode 13a formed in a stripe shape. In addition, spacers 14 are formed using photolithography, print, or a similar technique. Thereafter, as shown in FIG. 5E, transparent electrode 13b formed on substrate 22 is connected to spacers 14 formed on light conductor 12. Last, as shown in FIG. 5F, wave number vector conversion layer 19 is released from mold 31 so as to remove mold 31 from substrate 22. As a result, plasmon coupling sections 11 are formed between light conductor 12 and substrate 22.

Figure 6:
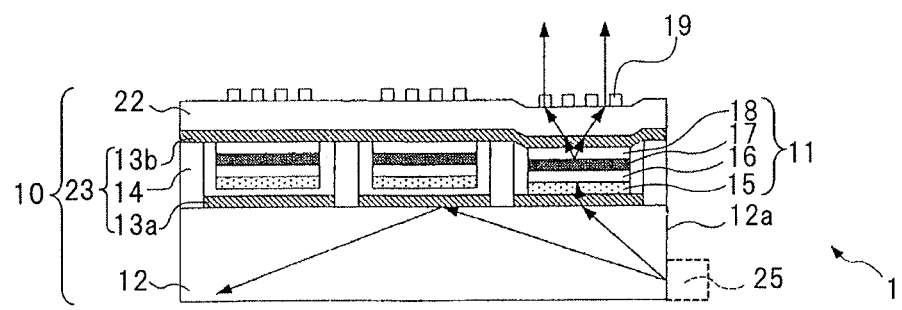
FIG. 6 is a sectional view describing the action of light in the display element according to the first embodiment.

In display element 1 having the foregoing structure, the action of light performed after light emitted from light emitting element 25 enters light conductor 12 until light exits wave number vector conversion layer 19 of plasmon coupling sections 11 will be described. FIG. 6 is a sectional view describing the action of light in display element 1.

As shown in FIG. 6, light emitted from light emitting element 25 is transmitted through light incident plane 12a of light conductor 12 and propagates therein while it is totally reflected therein. The light that propagates in light conductor 12 reaches the interface between transparent electrode 13a and light conductor 12. When optical connection mechanism 23 of a particular pixel lies in the ON state, carrier generation layer 15 of plasmon coupling section 11 is moved to a first position at which carrier generation layer 15 of plasmon coupling sections 11 makes contact with transparent electrode 13a and thereby light that is transmitted through transparent electrode 13a enters carrier generation layer 15. In contrast, when optical connection mechanism 23 lies in the OFF state, light that exits light conductor 12 is totally reflected at the interface between transparent electrode 13a and a space formed by transparent electrode 13a and carrier generation layer 15 and returned to light conductor 12. Thus, the light does not enter plasmon coupling sections 11. The light that is returned to light conductor 12 enters plasmon coupling section 11 whose optical connection mechanism 23 lies in the ON state and then exits wave number conversion layer 19. By repeating this operation, most of light that enters light conductor 12 exits desired plasmon coupling section 11 that comprises a pixel.

Carrier generation layer 15 generates carriers with light that enters therein. The generated carriers plasmon-couple with free electrons contained in plasmon excitation layer 17. Plasmon coupling causes light to enter second dielectric constant layer 18. The light enters wave number vector conversion layer 19 through transparent electrode 13b and substrate 22. Wave number vector conversion layer 19 diffracts the light and then it exits display element 1. Light that exits one point of the interface between plasmon excitation layer 17 and second dielectric constant layer 18 has a ring-shaped intensity distribution in which light spreads in a concentric circular shape as it propagates. Assuming that the exit angle with the highest intensity is referred to as the center exit angle and the angular width from the center exit angle to an exit angle having the half intensity of the highest intensity is referred to as the exit angular width, the center exit angle and the exit angular width of light that exits second dielectric constant layer 18 depend on the dielectric constant of plasmon excitation layer 17 and the effective dielectric constants of layers that sandwich plasmon excitation layer 17.

Assuming that the pitch of the periodic structure of wave number vector conversion layer 19 is denoted by $\Lambda$, the complex effective dielectric constant of the exit side portion (wave number vector conversion layer 19 side) of plasmon excitation layer 17 is denoted by $\epsilon_{\mathit{eff\,out}}$, the dielectric constant of the ambient medium is denoted by $\epsilon_m$, and the wave length in vacuum of light that exits wave number vector conversion layer 19 is denoted by $\lambda_o$, then center exit angle $\theta_{rad}$ of light that exits wave number vector conversion layer 19 can be expressed as follows.

[Formula 5]

$$\theta_{rad} = \mathrm{Sin}^{-1}\left(\frac{\mathrm{Re}[\sqrt{\epsilon_{\mathit{eff\,out}}}]\sin\theta - i\frac{\lambda_0}{\Lambda}}{\mathrm{Re}[\sqrt{\epsilon_m}]}\right) \quad \text{Formula (5)}$$

where i is a positive or negative integer.

In other words, part of light that enters carrier generation layer 15 exits display element 1 in the direction that depends on the properties of plasmon coupling sections 11. Since the luminous intensity distribution of light emitted from display element 1 depends only on the properties of plasmon coupling sections 11, display element 1 can have high directivity. In other words, the luminous intensity distribution of light emitted from display element 1 does not depend on the luminous intensity distribution of light emitting element 25.

As described above, in display element 1 according to the first embodiment, the exit angle of light that exits wave number vector conversion layer 19 depends on the effective dielectric constant of the incident side portion of plasmon excitation layer 17 and the effective dielectric constant of the exit side portion thereof. Thus, the directivity of the light emitted from display element 1 is not restricted by the directivity of light emitting element 25. In addition, using plasmon coupling in the light emission process, display element 1 according to this embodiment can narrow the emission angle of light that is emitted and thereby improve the directivity of the light that is emitted. In other words, according to this embodiment, the etendue of light emitted from display element 1 can be decreased regardless of the etendue of light emitting element 25. In addition, since the etendue of the light emitted from display element 1 is not restricted by the etendue of light emitting element 25, if a plurality of light emitting elements 25 are provided, while the etendue of the light emitted from display element 1 is kept low, incident lights of light emitting elements 25 can be combined.

Next, display elements according to other embodiments will be described. Display elements according to other embodiments are different from the display element according to the first embodiment in plasmon coupling sections or part of structure. Thus, in display elements according to the other embodiments, similar structural portions to those of the first embodiment are denoted by similar reference numerals and their description will be omitted.

Second Embodiment

Figure 7:
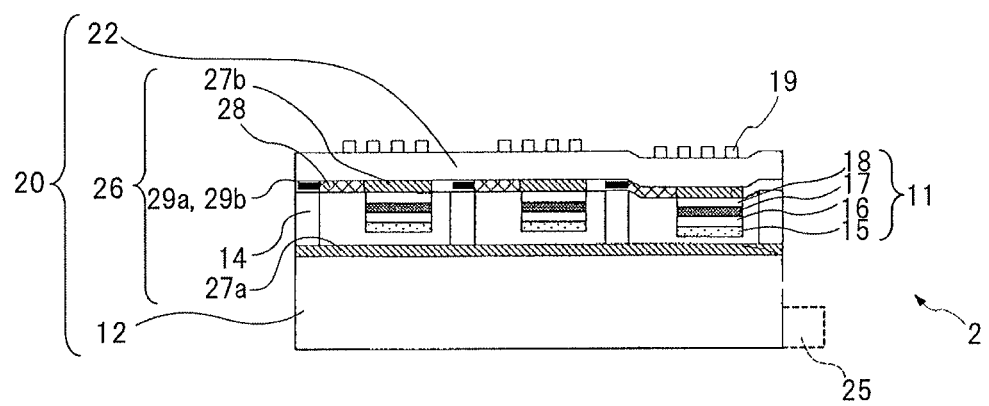
FIG. 7 is a sectional view schematically showing a display element according to a second embodiment.

FIG. 7 is a sectional view schematically showing a display element according to a second embodiment of the present invention. The display element according to the second embodiment is different from that according to the first embodiment in the structure of an optical connection mechanism. Since the structure of the second embodiment is the same as that of the first embodiment except for the optical connection mechanism, similar structural portions to those of the first embodiment are denoted by similar reference numerals and their description will be omitted.

According to the first embodiment, transparent electrodes 13a and 13b formed in matrix shapes were used. In contrast, as shown in FIG. 7, optical connection mechanism 26 of display element 2 according to the second embodiment has a pair of transparent electrodes 27a and 27b and TFTs 28 that selectively drive transparent electrode 27b arranged on substrate 22 side.

Figure 8:
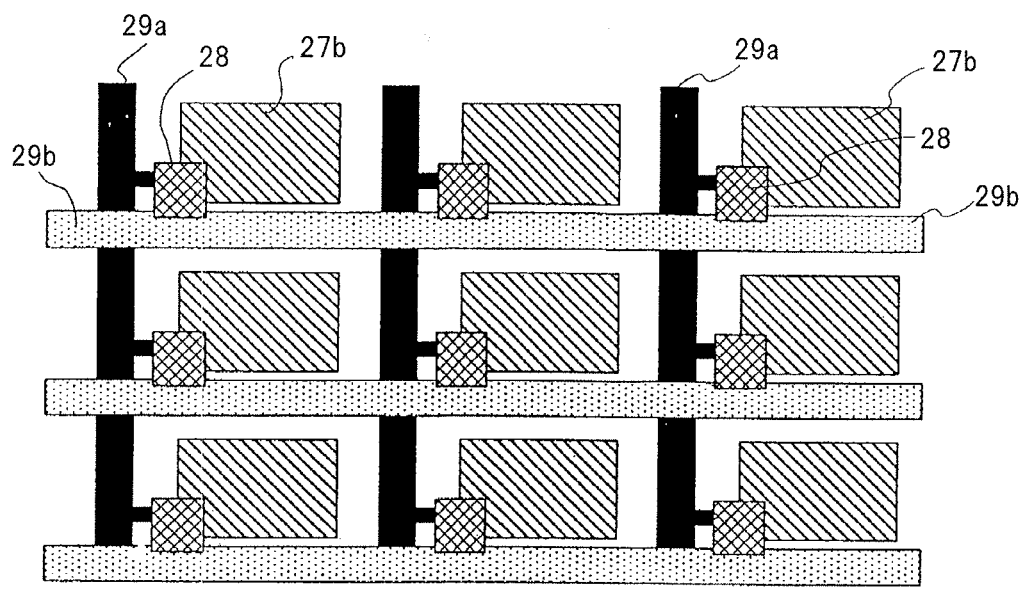
FIG. 8 is a plan view showing part of an optical connection mechanism of the display element according to the second embodiment.

FIG. 8 is a plan view showing part of optical connection mechanism 26 of display element 2 according to the second embodiment. FIG. 8 shows transparent electrode 27b that comprises nine pixels. As shown in FIG. 8, a plurality of TFT electrodes 29a and a plurality of TFT electrodes 29b are arranged on a bottom plane of substrate 22 opposite to light conductor 12 such that the plurality of TFT electrodes 29a are orthogonal to the plurality of TFT electrodes 29b. TFTs 28 are arranged at intersections of TFT electrodes 29a and TFT electrodes 29b. TFTs 28 are electrically connected to transparent electrode 27b. Thus, transparent electrode 27a of optical connection mechanism 26 is formed on a plane of light conductor 12 opposite to substrate 22 and is structured as a common electrode for all pixels.

TFTs 28 can be manufactured using a known manufacturing technique. The manufacturing method for display element 2 according to the second embodiment is the same as that according to the first embodiment. In addition, since the operation of optical connection mechanism 26 is the same as that of optical connection mechanism 23 according to the first embodiment, a description of the operation of optical connection mechanism 26 will be omitted.

Display element 2 according to the second embodiment having the foregoing structure can obtain the same effect as the first embodiment and can achieve a display element having high luminance and high directivity. In addition, since optical connection mechanism 26 of the second embodiment uses TFTs 28, the power consumption of display element 2 can be reduced.

Third Embodiment

Figure 9:
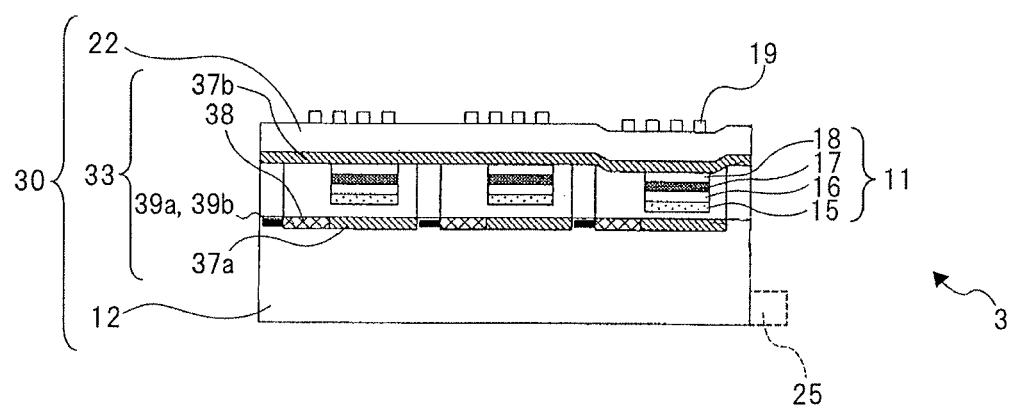
FIG. 9 is a sectional view schematically showing a display element according to a third embodiment.

FIG. 9 is a sectional view schematically showing a display element according to a third embodiment of the present invention. The display element according to the third embodiment is different from that according to the first embodiment in the structure of an optical connection mechanism. Since the structure of the third embodiment is the same as that according to the first embodiment except for the optical connection mechanism, similar structural portions to those of the first embodiment are denoted by similar reference numerals and their description will be omitted.

According to the foregoing second embodiment, TFTs 28 and TFT electrodes 29a and 29b drive transparent electrode 27b arranged on substrate 22 side. In contrast, as shown in FIG. 9, optical connection mechanism 33 of display element 3 according to the third embodiment has a pair of transparent electrodes 37a and 37b and TFTs 38 that selectively drive transparent electrodes 37b arranged on light conductor 12 side.

A plurality of TFT electrodes 39a and a plurality of TFT electrodes 39b are arranged on a plane of light conductor 12 opposite to substrate 22 such that the plurality of TFT electrodes 39a are orthogonal to the plurality of TFT electrodes 39b. TFTs 38 are arranged at intersections of TFT electrodes 39a and TFT electrodes 39b. TFTs 38 are electrically connected to transparent electrode 37a. Transparent electrode 37b of optical connection mechanism 33 is formed entirely on a bottom plane of substrate 22 opposite to light conductor 12 and is structured as a common electrode for all pixels.

Display element 3 according to the third embodiment having the foregoing structure can obtain the same effect as the first embodiment and can achieve a display element having high luminance and high directivity. In addition, as in the second embodiment, since optical connection mechanism 33 of the third embodiment uses TFTs 38, the power consumption of display element 3 can be reduced.

Fourth Embodiment

Figure 10:
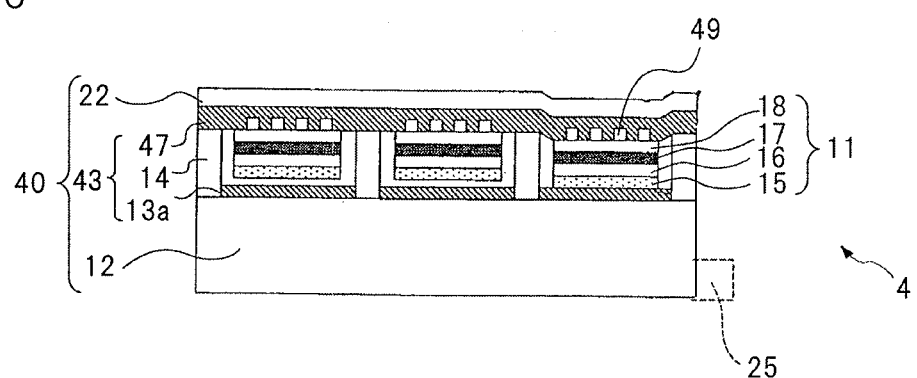
FIG. 10 is a sectional view schematically showing a display element according to a fourth embodiment.

FIG. 10 is a sectional view schematically showing a display element according to a fourth embodiment of the present invention. The display element according to the fourth embodiment is different from that according to the first embodiment as regards the position of a wave number vector conversion layer. In the fourth embodiment, structural portions similar to those of the first embodiment are denoted by similar reference numerals and their description will be omitted.

As shown in FIG. 10, display element 4 according to the fourth embodiment has light valve section 40; a plurality of plasmon coupling sections 11 arranged in light valve section 40; and wave number vector conversion layer 49 arranged therein. According to the foregoing first embodiment, wave number vector conversion layer 19 is arranged on substrate 22. In contrast, according to the fourth embodiment, optical connection mechanism 49 is arranged between substrate 22 and plasmon excitation layer 17.

Light valve section 40 has optical connection mechanism 43 that moves plasmon coupling sections 11. Optical connection mechanism 43 has transparent electrode 47 in which wave number vector conversion layer 49 is buried. Transparent electrode 47 is arranged on a bottom plane of substrate 22 opposite to light conductor 12. Like transparent electrode 13b according to the first embodiment, transparent electrode 47 is arranged in a stripe shape such that transparent electrode 47 is orthogonal to transparent electrode 13a that is arranged in a stripe shape.

Wave number vector conversion layer 49 has a two-dimensional periodic structure and is buried in a plane of transparent electrode 47 opposite to light conductor 12.

In display element 4 according to the fourth embodiment, the effective dielectric constant of the exit side portion including second dielectric constant layer 18, wave number vector conversion layer 49, transparent electrode 47, substrate 22, and the medium with respect to plasmon excitation layer 17 is higher than the effective dielectric constant of the incident side portion including first dielectric constant layer 16, carrier generation layer 15, and transparent electrode 13a with respect to plasmon excitation layer 17.

In display element 4 according to the fourth embodiment, since the distance between plasmon excitation layer 17 and wave number vector conversion layer 49 can be decreased, the light emission area of a secondary light source can be decreased and spreading of light emitted from display element 4 can be further decreased.

Fifth Embodiment

Figure 11:
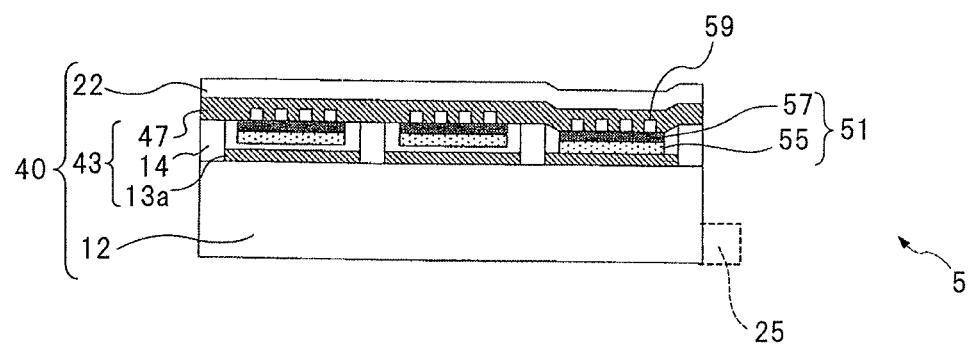
FIG. 11 is a sectional view schematically showing a display element according to a fifth embodiment.

FIG. 11 is a sectional view schematically showing a display element according to a fifth embodiment of the present invention. The display element according to the fifth embodiment is different from display element 1 according to the foregoing first embodiment in the structure of plasmon coupling sections. In display element 1 according to the first embodiment, light excited in plasmon excitation layer 17 exits wave number vector conversion layer 19. The display element according to the fifth embodiment is different from that according to the first embodiment in that surface plasmons that occur in the plasmon excitation layer exit the wave number vector conversion layer as light. The effective dielectric constant of the incident side portion of the plasmon excitation layer is set to be higher than the effective dielectric constant of the exit side portion of the plasmon excitation layer.

As shown in FIG. 11, display element 5 according to the fifth embodiment has light valve section 40; a plurality of plasmon coupling sections 51 arranged in light valve section 40; and wave number vector conversion layer 59 arranged therein.

Plasmon coupling sections 51 are arranged between substrate 22 and light conductor 12 of light valve section 40 and have a stacked structure in which carrier generation layer 55 and plasmon excitation layer 57 are successively stacked. Wave number vector conversion layer 59 has a two-dimensional periodic structure and is buried in a plane of transparent electrode 47 opposite to light conductor 12.

A second dielectric constant layer may be arranged between plasmon excitation layer 57 and carrier generation layer 55. Alternatively, a first dielectric constant layer may be arranged between plasmon excitation layer 57 and wave number vector conversion layer 59. The dielectric constant of the second dielectric constant layer is set to be higher than that of the first dielectric constant layer. The thicknesses of the first dielectric constant layer and the second dielectric constant layer need to be smaller than the thicknesses obtained from Formula (4).

Plasmon excitation layer 57 is sandwiched between two layers having dielectric constants. According to the fifth embodiment, these two layers correspond to carrier generation layer 55 and wave number vector conversion layer 59. In display element 2 according to this embodiment, the effective dielectric constant of the incident side portion including light conductor 12, transparent electrode 13a, and carrier generation layer 55 with respect to plasmon excitation layer 57 is higher than the effective dielectric constant of the exit side portion including wave number vector conversion layer 59, transparent electrode 47, substrate 22, and the medium with respect to plasmon excitation layer 57.

Specifically, the real part of the complex effective dielectric constant of the incident side portion (carrier generation layer 55 side) of plasmon excitation layer 57 is set to be higher than the real part of the complex effective dielectric constant of the exit side portion (wave number vector conversion layer 59 side) of plasmon excitation layer 57.

It is preferable that the imaginary part of the complex dielectric constant of any layer including light conductor 12 (excluding carrier generation layer 55 and plasmon excitation layer 57) and a medium that makes contact with wave number vector conversion layer 59 be as small as possible. When the imaginary part of the complex dielectric constant is set to be as small as possible, plasmon coupling is managed to easily occur so as to reduce optical loss.

In display element 5 having the foregoing structure, the action of light performed after light emitted from light emitting element 25 enters plasmon coupling section 51 until light exits wave number vector conversion layer 59 will be described.

Like display element 1 according to the first embodiment, when carrier generation layer 55 is connected to transparent electrode 13a, light that is emitted from light emitting element 25 passes through the interface between carrier generation layer 55 and transparent electrode 13a and then enters desired plasmon coupling section 51 that comprises a pixel. Light enters carrier generation layer 55 through light conductor 12. Carrier generation layer 55 generates carriers with the incident light. The generated carriers plasmon-couple with free electrons contained in plasmon excitation layer 57. Through plasmon coupling, surface plasmons are excited at the interface between plasmon excitation layer 57 and wave number vector conversion layer 59. Wave number vector conversion layer 59 diffracts the excited surface plasmons and then light exits display element 5.

If the dielectric constant at the interface between plasmon excitation layer 57 and wave number vector conversion layer 59 is uniform, namely the interface is plane, surface plasmons excited at the interface cannot be extracted. According to this embodiment, since wave number vector conversion layer 59 causes the dielectric constant at the interface to vary, surface plasmons are diffracted and extracted as light. Light that exits one point of wave number vector conversion layer 59 has a ring-shaped luminance intensity distribution that concentrically spreads as the light propagates. Assuming that the exit angle having the highest intensity is referred to as the center exit angle and that the pitch of the periodic structure of wave number vector conversion layer 59 is denoted by Λ, center exit angle $\theta_{rad}$ of light that exits wave number vector conversion layer 59 can be expressed as follows.

[Formula 6]

$$\theta_{rad} = \mathrm{Sin}^{-1}\left(\frac{k_{spp} - i\frac{2\pi}{\Lambda}}{k_0}\right) \quad \text{Formula (6)}$$

where i is a positive or negative integer. Since the wave number at the interface between plasmon excitation layer 57 and wave number vector conversion layer 59 is only a wave number approximately obtained from Formula (3), the angle distribution of light that exits wave number vector conversion layer 33 obtained from Formula (6) also becomes narrow.

As in the first embodiment, in display element 5 according to the fifth embodiment having the foregoing structure, part of light that enters carrier generation layer 55 exits display element 5 in a direction that depends on the properties of plasmon coupling sections 51. Thus, since the luminous intensity distribution of light emitted from display element 5 only depends on the properties of plasmon coupling sections 51, display element 5 can have high directivity. In addition, since the display element 5 according to the fifth embodiment has a smaller number of layers than display element 1 according to the first embodiment, the number of steps of the manufacturing process can be decreased.

Sixth Embodiment

Figure 12:
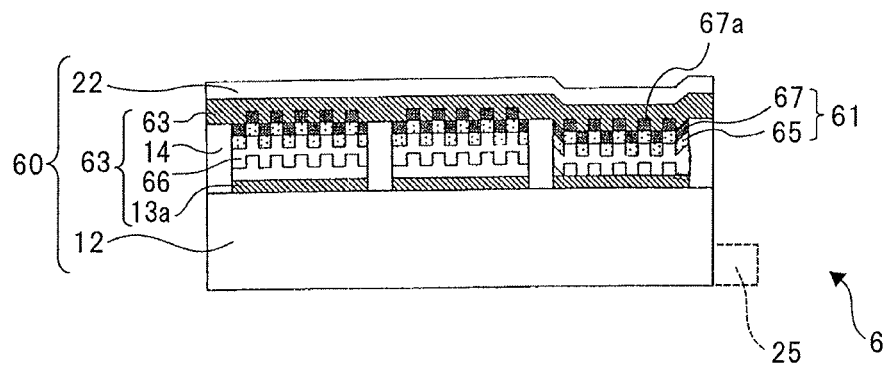
FIG. 12 is a sectional view schematically showing a display element according to a sixth embodiment.

FIG. 12 is a sectional view schematically showing a display element according to a sixth embodiment of the present invention. The display element according to the sixth embodiment is different from display element 1 according to the first embodiment in the structure of plasmon coupling sections.

As shown in FIG. 12, plasmon coupling sections 61 of display element 6 according to the sixth embodiment are arranged between substrate 22 and light conductor 12 of light valve section 60. Plasmon coupling sections 61 have a stacked structure in which carrier generation layer 65 and plasmon excitation layer 67 are successively stacked. Transparent electrode 63 is stacked on a light exit side of plasmon excitation layer 67, whereas hard coat layer 66 is stacked on a light incident side of carrier generation layer 65.

Plasmon excitation layer 67 according to the sixth embodiment has periodic structure 67a that has the functions of the foregoing wave number vector conversion layers 19, 49, and 59. Periodic structure 67a has a one-dimensional or two-dimensional grating structure (uneven structure). Likewise, hard coat layer 66 and carrier generation layer 37 have a periodic structure corresponding to periodic structure 67a of plasmon excitation layer 67. Likewise, transparent electrode 63 has a periodic structure in the shape of periodic structure 67a of plasmon excitation layer 67. Thus, part of plasmon excitation layer 67 is buried in a plane of transparent electrode 63 opposite to light conductor 12.

When light enters carrier generation layer 65, surface plasmons occur at the interface between transparent electrode 63 and plasmon excitation layer 67 that contracts transparent electrode 63 and at the interface between carrier generation layer 65 and plasmon excitation layer 67. The surface plasmons can be extracted as light from plasmon excitation layer 67 in the direction that satisfies Formula (9) that follows.

Specifically, the angular frequency in vacuum of light that exits carrier generation layer 65 is denoted by ω, the light speed in vacuum is denoted by c, the dielectric constant of plasmon excitation layer 67 is denoted by $\epsilon_{metal}$, the dielectric constant of carrier generation layer 65 is denoted by $\epsilon_{sub}$, the dielectric constant of transparent electrode 63 that makes contact with plasmon excitation layer 67 is denoted by $\epsilon_{medi}$, the wave number of surface plasmons at the interface between transparent electrode 63 that makes contact with plasmon excitation layer 67 and plasmon excitation layer 67 is denoted by $k_{spp.\ meth}$, the wave number of surface plasmons at the interface between carrier generation layer 65 and plasmon excitation layer 67 is denoted by $k_{spp.\ sub}$, the wave number vector in the x direction of periodic structure 67a of plasmon excitation layer 67 is denoted by $K_x$, and the wave number vector in the y direction of periodic structure 67a of plasmon excitation layer 67 is denoted by $K_y$ (where the xy plane is a plane in parallel with substrate 22).

[Formula 7]
$$k_{spp,medi} = \frac{\omega}{c}\sqrt{\frac{\epsilon_{metal}\epsilon_{medi}}{\epsilon_{metal} + \epsilon_{medi}}} \quad (7)$$

[Formula 8]
$$k_{spp,sub} = \frac{\omega}{c}\sqrt{\frac{\epsilon_{metal}\epsilon_{subi}}{\epsilon_{metal} + \epsilon_{sub}}} \quad (8)$$

[Formula 9]
$$k_{spp,medi} + mK_x + nK_y = \frac{\omega}{c}\sqrt{\epsilon_{medi}}\sin\theta \quad (9)$$

[Formula 10]
$$k_{spp,medi} + mK_x + nK_y = k_{spp,sub} \quad (10)$$

Light exits plasmon excitation layer 67 in the direction of angle θ that satisfies Formula (9). In this case, m and n are positive or negative integers. When Formula (10) is satisfied, the intensity of light emitted from display element 6 becomes the highest.

FIG. 13A to FIG. 13E show a manufacturing process for the plasmon coupling sections of display element 6 according to the sixth embodiment.

Figure 13A:
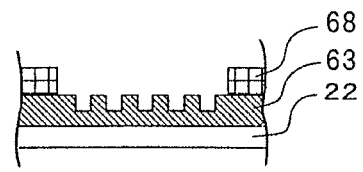
FIG. 13A is a sectional view describing a manufacturing method for plasmon coupling sections of the display element according to the sixth embodiment.

First, transparent electrode 63 and a resist film are formed on substrate 22 using a film coating technique such as spin coat, vapor deposition, or spattering technique (this step is not shown). Thereafter, a pattern having a desired periodic structure is drawn on the resist film using electron beam, photolithography, or print technique and then as shown in FIG. 13A the pattern is transferred to transparent electrode 63 using wet or dry etching technique.

Thereafter, the resist film is removed from transparent electrode 63 and then resist film 68 is coated on transparent electrode 63 using spin coat technique. Thereafter, part of resist film 68 corresponding to plasmon coupling sections 61 for pixels is removed using electron beam, photolithography, or print technique.

Figure 13B:
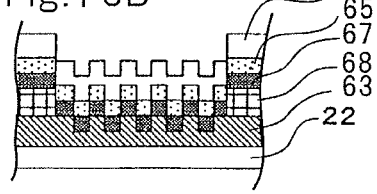
FIG. 13B is a sectional view describing the manufacturing method for the plasmon coupling sections of the display element according to the sixth embodiment.
Figure 13C:
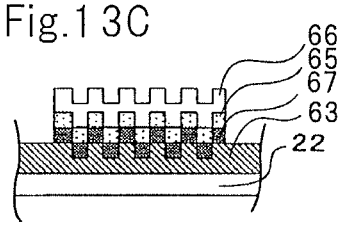
FIG. 13C is a sectional view describing the manufacturing method for the plasmon coupling sections of the display element according to the sixth embodiment.

Thereafter, as shown in FIG. 13B, plasmon excitation layer 67, carrier generation layer 65, and hard coat layer 66 are successively stacked on transparent electrode 63 using a film forming technique such as spin coat, vapor deposition, or spattering technique. Thereafter, as shown in FIG. 13C, individual layers that comprise plasmon coupling sections 61 formed on resist film 68 are peeled off from transparent electrode 63 on substrate 22 together with resist film 68. As a result, plasmon coupling sections 61 are formed at predetermined positions corresponding to pixels on substrate 22.

Figure 13D:
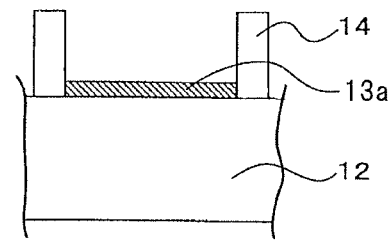
FIG. 13D is a sectional view describing the manufacturing method for the plasmon coupling sections of the display element according to the sixth embodiment.
Figure 13E:
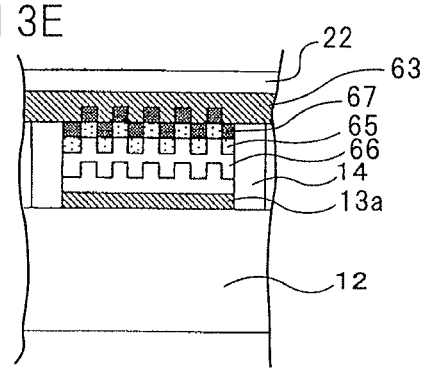
FIG. 13E is a sectional view describing the manufacturing method for the plasmon coupling sections of the display element according to the sixth embodiment.

Thereafter, as shown in FIG. 13D, transparent electrode 13a is formed in a stripe shape on light conductor 12 such that transparent electrode 13a is orthogonal to transparent electrode 63 that is formed in a stripe shape. Thereafter, spacers 14 are formed using photolithography, print, or a similar technique. Thereafter, as shown in FIG. 13E, transparent electrode 63 formed on substrate 22 is connected to spacers 14 formed on light conductor 12. As a result, plasmon coupling sections 61 are formed between light conductor 12 and substrate 22. It should be appreciated that this manufacturing method is just an example and therefore the present invention is not limited thereto.

Display element 6 according to the sixth embodiment having the foregoing structure can obtain the same effect as the foregoing embodiments and thereby the sixth embodiment can realize a display element having high luminance and high directivity. In addition, since the number of layers of the display element according to the sixth embodiment is smaller than that according to the first to fourth embodiments, the number of steps of the manufacturing process can be decreased.

Seventh Embodiment

Figure 14:
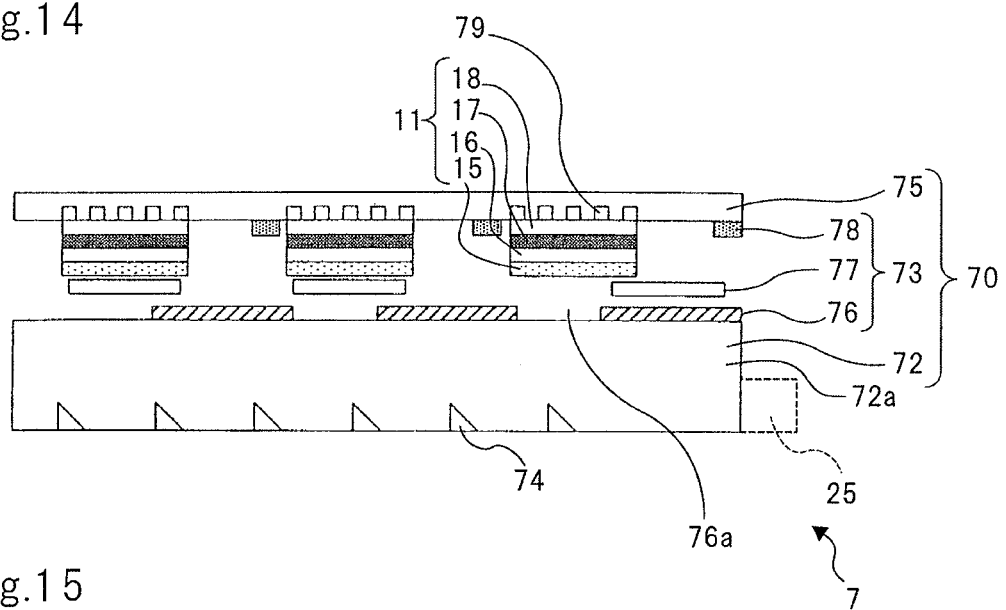
FIG. 14 is a sectional view schematically showing a display element according to a seventh embodiment.

FIG. 14 is a sectional view schematically showing a display element according to a seventh embodiment of the present invention. The display element according to the seventh embodiment is different from display elements according to the first to sixth embodiments in that a light valve section has a shutter mechanism as an optical shutter means that switches between a transmitting state and a shading state for light emitted from a light emitting element. Since plasmon coupling sections according to the seventh embodiment are the same as plasmon coupling sections 11 according to the first embodiment, similar structural portions to those in the first embodiment are denoted by similar reference numerals and their description will be omitted.

As shown in FIG. 14, display element 7 according to the seventh embodiment has light valve section 70; a plurality of plasmon coupling sections 11 arranged in light valve section 70; and wave number vector conversion layer 79 arranged therein.

Light valve section 70 has light conductor 72 in to which light emitted from light emitting element 25 enters; the plurality of shutter mechanisms 73 arranged corresponding to a position of light that exits light conductor 72; and substrate 75 on which the plurality of plasmon coupling sections 11 are two-dimensionally and regularly arranged.

Arranged on an upper plane of light conductor 12 opposite to the bottom plane is reflection film 76. Reflection film 76 has a plurality of openings 76a that are light transmitting regions that correspond to the plurality of plasmon coupling sections 11 and through which light that exits light conductor 12 enters plasmon coupling sections 11. Reflection film 76 is made of, for example, a metal material such as silver or aluminum or a dielectric constant laminate film.

Shutter mechanisms 73 are arranged on a bottom plane of substrate 75 opposite to light conductor 72. Shutter mechanisms 73 each have MEMS shutter 77 that can open and close opening 76a of reflection film 76; and TFT (Thin Film Transistor) 78 that causes MEMS shutter 77 to open/close opening 76a. MEMS shutter 77 or light conductor 72 side plane of MEMS shutter 77 is made of a reflection material having a relatively high reflectance.

The plurality of plasmon coupling sections 11 are arranged as pixels in a matrix shape corresponding to opening 76a of reflection film 76 arranged on light conductor 12. Likewise, the plurality of shutter mechanisms 73 are arranged corresponding to pixels that are composed of the plurality of plasmon coupling sections 11. FIG. 14 shows plasmon coupling sections 11 that comprise three pixels.

Plasmon coupling sections 11 is arranged immediately below substrate 75. Second dielectric constant layer 18 is connected to a bottom plane of substrate 75 opposite to light conductor 72.

Wave number vector conversion layer 79 is stacked on second dielectric constant layer 18 and buried in a bottom plane of substrate 75 opposite to light conductor 12.

According to this embodiment, light conductor 72 is provided. Alternatively, light conductor 72 may be omitted from light valve section 70. For example, a light source such as light emitting element 25 may be arranged on substrate 75 opposite to shutter mechanisms 73 (on a light incident side of shutter mechanisms 73).

In display element 7 according to the seventh embodiment, the effective dielectric constant of the exit side portion including the entire structure stacked on wave number vector conversion layer 79 side of plasmon excitation layer 17, wave number vector conversion layer 79, substrate 75, and the medium that contacts substrate 75 is set to be higher than the effective dielectric constant of the incident side portion including the entire structure stacked on carrier generation layer 15 side of plasmon excitation layer 17.

The manufacturing process for display element 7 according to this embodiment is the same as that according to the first embodiment. By assembling substrate 75 on which plasmon coupling sections 11 and TFTs 76 are formed and light conductor 72 on which MEMS shutters 77, structural members 74, and reflection film 76 are formed, display element 7 is obtained.

Figure 15:
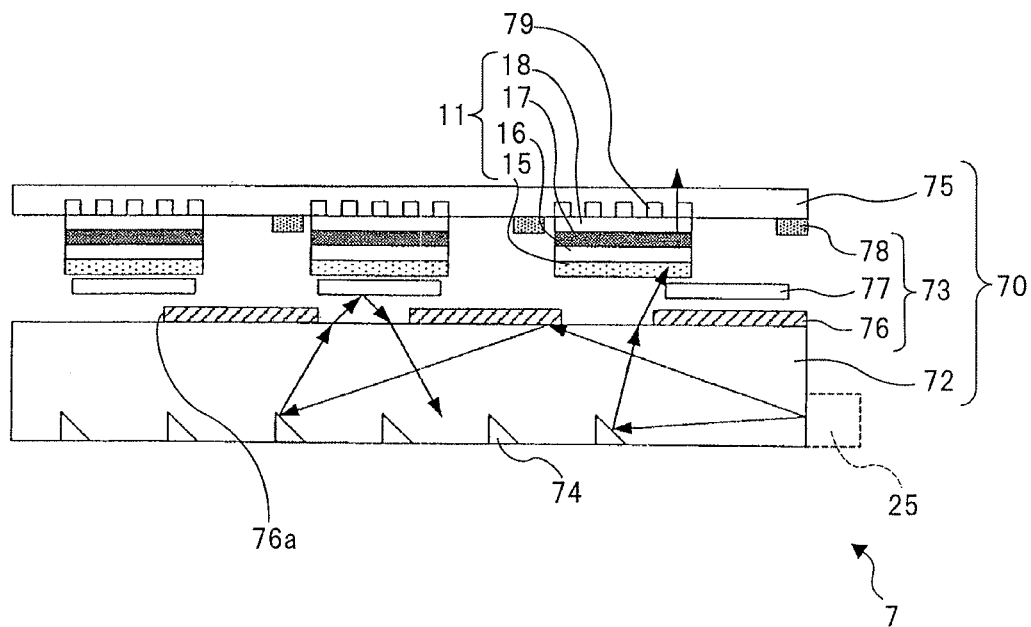
FIG. 15 is a sectional view describing the action of light in the display element according to the seventh embodiment.

In display element 7 having the foregoing structure, the action of light performed after light emitted from light emitting element 25 enters light conductor 72 until light exits wave number vector conversion layer 79 through plasmon coupling sections 11 will be described. FIG. 15 is a sectional view describing the action of light in display element 7.

As shown in FIG. 15, light emitted from light emitting element 25 is transmitted through light incident plane 72a of light conductor 72 and propagates therein while it is totally reflected therein. When light that propagates in light conductor 72 reaches structural members 74, structural members 74 change orientation of the light and then the light enters openings 76a of reflection film 76. At this point, if TFT 78 of shutter mechanism 73 is in the ON state, MEMS shutter 77 are moved to a position at which opening 76a is exposed. Thus, light that passes through opening 76a enters carrier generation layer 15. In contrast, if TFT 78 is in the OFF state, MEMS shutter 77 shades light and reflects it to shutter 77. Then, the light returns to light conductor 72. Light that passes through opening 76a of reflection film 76 enters plasmon coupling section 11. Thereafter, wave number vector conversion layer 79 diffracts the light and then light exits substrate 75. By repeating this operation, most of light that enters light conductor 72 exits desired plasmon coupling section 11 that comprises a pixel.

Display element 7 according to the seventh embodiment can obtain the same effect as the foregoing first embodiment. Thus, the seventh embodiment can realize a display element having high luminance and high directivity.

Eighth Embodiment

Figure 16:
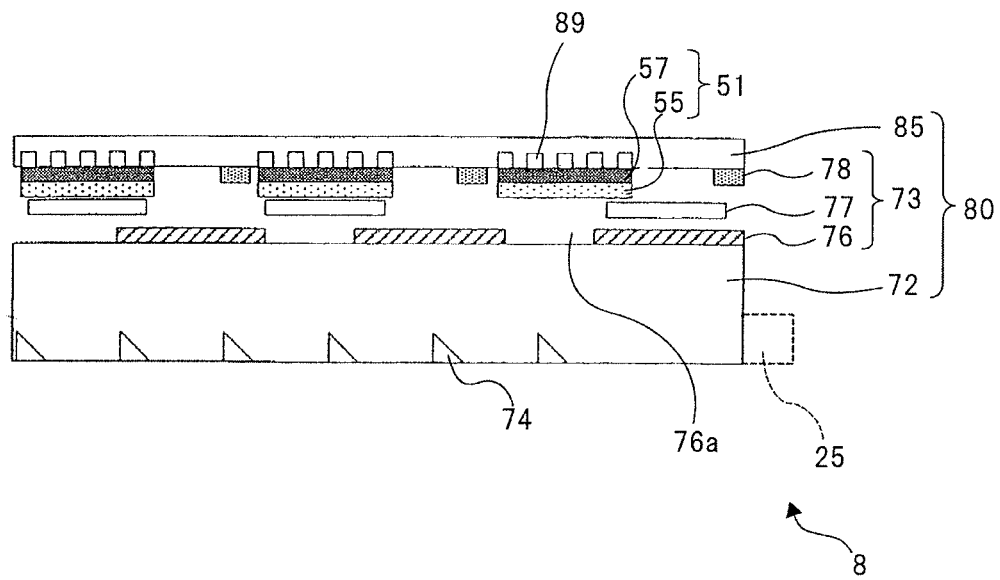
FIG. 16 is a sectional view schematically showing a display element according to an eighth embodiment.

FIG. 16 is a sectional view schematically showing a display element according to an eight embodiment of the present invention. The eighth embodiment is different from the seventh embodiment with respect to plasmon coupling sections. The plasmon coupling sections according to the eighth embodiment are the same as plasmon coupling sections 51 according to the fifth embodiment. In the eighth embodiment, structural portions similar to those in the fifth and seventh embodiments are denoted by similar reference numerals and their description will be omitted.

As shown in FIG. 16, display element 8 according to the eight embodiment has light valve section 80; a plurality of plasmon coupling sections 51 arranged in light valve section 80; and wave number vector conversion layer 89 arranged therein. Light valve section 80 has the same structure as light valve section 70 according to the seventh embodiment except for substrate 85 in which wave number vector conversion layer 89 is buried. Plasmon coupling sections 51 have wave number vector conversion layer 89 arranged between substrate 85 and plasmon excitation layer 57. Wave number vector conversion layer 89 is buried in a bottom plane of substrate 85 opposite to substrate 85.

Like the fifth embodiment, in display element 8 according to the eighth embodiment, surface plasmons excited in plasmon excitation layer 57 exit wave number vector conversion layer 89 of display element 8 as light. Thus, in display element 8, the effective dielectric constant of the incident side portion including carrier generation layer 15 with respect to plasmon excitation layer 17 is higher than the effective dielectric constant of the exit side portion including wave number vector conversion layer 89, substrate 85, and the medium that makes contact with substrate 85 with respect to plasmon excitation layer 57.

If necessary, a dielectric constant layer may be arranged adjacent to either or both of the incident side and the exit side of plasmon excitation layer 57. If dielectric constant layers are arranged such that they sandwich plasmon excitation layer 57, first dielectric constant layer 16 is arranged adjacent to wave number vector conversion layer 89 side of plasmon excitation layer 57, whereas second dielectric constant layer 18 is arranged adjacent to carrier generation layer 55 side of plasmon excitation layer 57, second dielectric constant layer 18 having a higher dielectric constant than first dielectric constant layer 16. If first dielectric constant layer 16 and second dielectric constant layer 18 are arranged adjacent to plasmon excitation layer 57, the thicknesses of first dielectric constant layer 16 and second dielectric constant layer 18 are set be to smaller than the effective interaction distance of plasmons.

Display element 8 according to the eighth embodiment having the foregoing structure uses surface plasmons as in the fifth embodiment. The eighth embodiment can obtain the same effects as the foregoing embodiments and can realize a display element having high luminance and high directivity.

Ninth Embodiment

Figure 17:
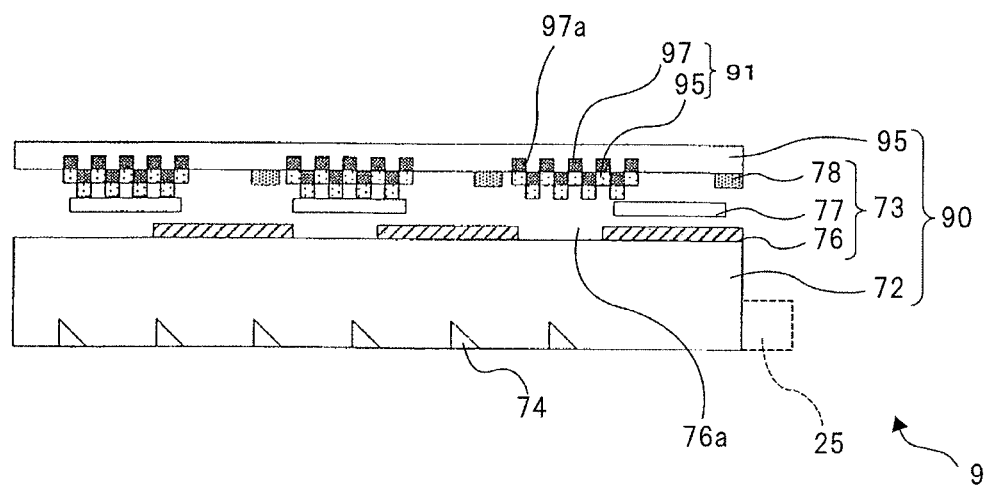
FIG. 17 is a sectional view schematically showing a display element according to a ninth embodiment.

FIG. 17 is a sectional view schematically showing a display element according to a ninth embodiment of the present invention. The ninth embodiment is different from the foregoing seventh embodiment in that plasmon coupling sections according to the ninth embodiment are the same as plasmon coupling sections 61 according to the sixth embodiment. In the ninth embodiment, similar structural portions to those in the sixth and seventh embodiments are denoted by similar reference numerals and their description will be omitted.

As shown in FIG. 17, display element 9 according to the ninth embodiment has light valve section 90; and a plurality of plasmon coupling sections 91 arranged in light valve section 90. Light valve section 90 has the same structure as light valve section 70 according to the seventh embodiment except for substrate 95 in which plasmon excitation layer 97 that will be described later is buried.

As in the sixth embodiment, plasmon coupling sections 91 of display element 9 according to the ninth embodiment use surface plasmons as the sixth embodiment and have a stacked structure in which carrier generation layer 95 and plasmon excitation layer 97 are successively stacked. Part of plasmon excitation layer 97 is buried in the bottom plane of substrate 95 opposite to light conductor 72.

Plasmon excitation layer 97 according to the ninth embodiment has periodic structure 97a that has a function of the foregoing wave number vector conversion layer 19. Likewise, carrier generation layer 95 has a periodic structure in the shape of periodic structure 97a of plasmon excitation layer 97.

Display element 9 according to the ninth embodiment having the foregoing structure can obtain the same effect as the foregoing embodiments and thereby the ninth embodiment can realize a display element having high luminance and high directivity. In addition, since the number of layers of the display element according to the ninth embodiment is smaller than that according to the seventh and eighth embodiments, the number of steps of the manufacturing process can be decreased.

According to the foregoing seventh to ninth embodiments, shutter mechanisms are arranged on the incident side of plasmon coupling sections. Alternatively, shutter mechanisms may be arranged on the exit side of plasmon coupling sections. In this case, like the foregoing embodiments, the directivity of light emitted from the display element can be improved. However, in this case, since light that passes through the light conductor enters the plasmon coupling sections, optical loss occurs in pixels whose shutter mechanisms are closed. Thus, the structures of the foregoing embodiments are preferable.

According to the foregoing first to ninth embodiments, plasmon coupling sections are arranged between a substrate and a light conductor. It should be appreciated that the present invention is not limited to such a structure. Alternatively, a hard coat layer (not shown) may be arranged below the carrier generation layer of the plasmon coupling sections. The hard coat layer may be formed as a film that partly or entirely coats the outer circumference of the plasmon coupling sections.

Example 1

Figure 18:
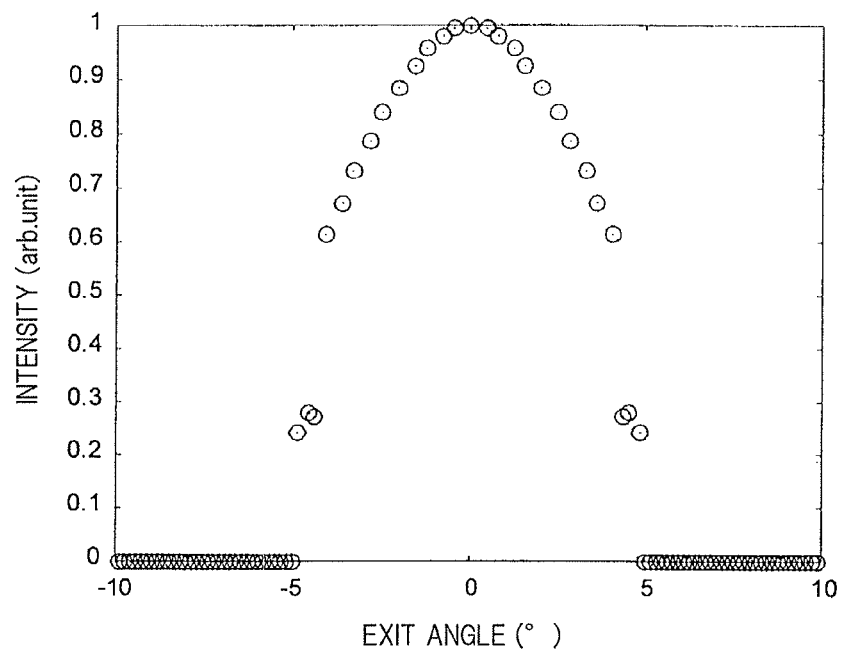
FIG. 18 is a schematic diagram showing an angle distribution of light emitted from the display element according to the fourth embodiment.

FIG. 18 shows an angle distribution of light that exits the display element according to the fourth embodiment. In FIG. 18, the horizontal axis represents the exit angle of light that exits display element 1, whereas the vertical axis represents the intensity thereof.

Light conductor 12 made of $SiO_2$, transparent electrode 13 made of ITO, carrier generation layer 15 made of a fluorescent substance containing PVA (polyvinyl alcohol) as a primary component, first dielectric constant layer 16 made of porous $SiO_2$, plasmon excitation layer 17 made of Ag, second dielectric constant layer 18 made of $TiO_2$, wave number vector conversion layer 49 made of $TiO_2$, transparent electrodes 13a and 47 made of ITO, and substrate 22 made of PEN (polyethylene naphthalate) plastic were prepared such that their thicknesses became 5 mm, 100 nm, 50 nm, 50 nm, 50 nm, 10 um, 950 nm, 200 nm, and 0.2 mm, respectively. The wave length of light emitted from carrier excitation layer 15 was 460 nm. The ambient gas of plasmon coupling sections 11 was air. The pitch and duty ratio of wave number vector conversion layer 18 were set to 262 nm and 0.5, respectively. The dielectric constant of porous $SiO_2$ was 1.12.

For simplicity, calculations were performed in two dimensions. When the full width of an angle at which the intensity of light emitted is halved is defined as an emission angle, the emission angle of light having a wavelength of 460 nm was ±4.2 (deg).

Thus, in the display element according to this embodiment, when the directivity of the emission angle of light emitted from the display element is improved and the grating structure of wave number vector conversion layer 49 is adequately adjusted, the emission angle can be narrowed within ±5 degrees so as to further improve the directivity.

The display element according to this embodiment can be suitably used for a display element of an image display device. In addition, the display element according to this embodiment may be used for a display element of a projection display device, a display element of an electronic device such as a mobile phone or a PDA (Personal Data Assistant), or a display device.

Figure 19:
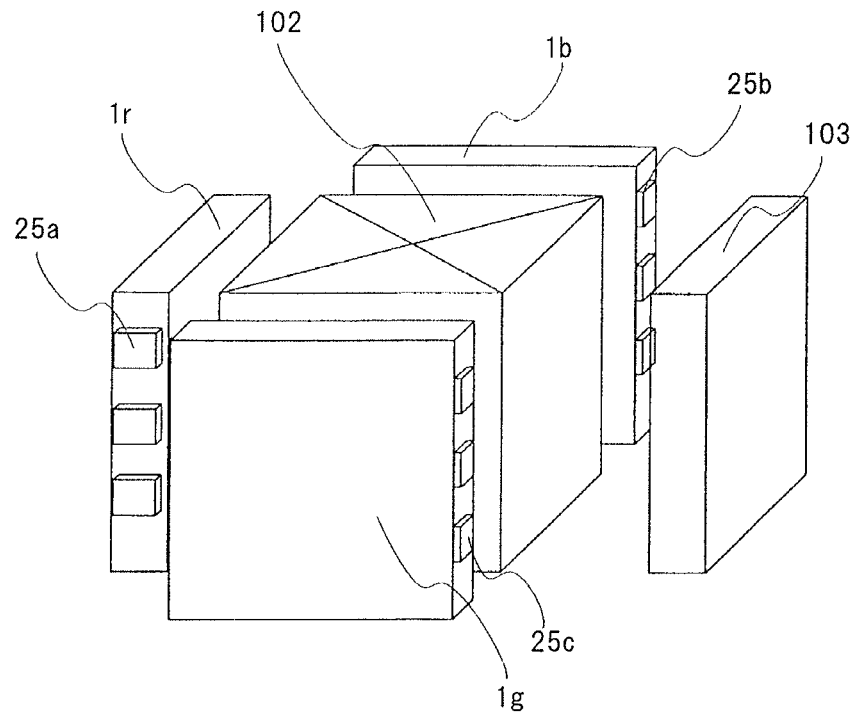
FIG. 19 is a perspective view schematically showing a projector having a solid state light source according to an embodiment of the present invention, a display element according to an embodiment of the present invention being applied to the projector.

Finally, with reference to an accompanying drawing, an example of a structure of a projector having a solid state light source as a projection display device to which a display element according to each of the foregoing first to ninth embodiments is applied will be described. FIG. 19 is a perspective view schematically showing a projector having a solid state light source according to an embodiment of the present invention.

As shown in FIG. 19, the projector having a solid state light source according to an embodiment of the present invention has a plurality of light emitting elements 25a, 25b, and 25c, red (R) display element 1r, green display element 1g, and blue display element 1b into which light of light emitting elements 25a, 25b, and 25c enters. In addition, the projector having a solid state light source has cross dichroic prism 102 that combines R, G, and B lights modulated by display elements 1r, 1g, and 1b; and projection optical system 103 including a projection lens (not shown) that projects light that exits projection optical system 103 on a projection plane such as a screen. This projector having a solid state light source has the structure of a three-panel type projector.

Figure 20:
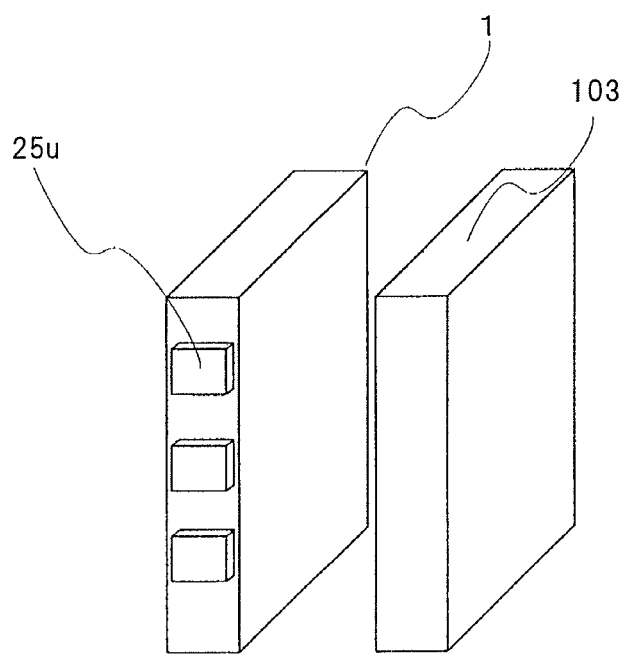
FIG. 20 is a perspective view schematically showing a projector having a solid state light source according to another embodiment of the present invention, a display element according to an embodiment of the present invention being applied to the projector.

The display element according to each embodiment of the present invention can be applied to a single-panel type projector shown in FIG. 20. FIG. 20 is a perspective view schematically showing a projector having solid state light source according to another embodiment of the present invention.

As shown in FIG. 20, the projector having a solid state light source according to another embodiment has a plurality of light emitting elements 25u; display element 1 into which light emitted from light emitting elements 25u enters; and projection optical system 103 that includes a projection lens (not shown) that projects light emitted from display element 1 on a projection plane such as a screen. Plasmon coupling sections (not shown) of display element 1 have carrier generation layers (not shown) made of materials that differ in pixels corresponding to R, G, and B.

When a display element according to an embodiment of the present invention is applied to the projectors having solid state light source according to embodiments shown in FIG. 19 and FIG. 20, the luminance of projection images can be improved.

With reference to the embodiments, the present invention has been described. However, it should be understood by those skilled in the art that the structure and details of the present invention may be changed in various manners without departing from the scope of the present invention.

The present application claims priority based on Japanese Patent Application JP 2010-112072 filed on May 14, 2010, the entire contents of which are incorporated herein by reference in its entirety.

REFERENCE NUMERALS

1 Display element
10 Light valve section
11 Plasmon coupling sections
15 Carrier generation layer
16 First dielectric constant layer
17 Plasmon excitation layer
18 Second dielectric constant layer
19 Wave number vector conversion layer
22 Substrate
23 Optical connection mechanism
25 Light emitting element

The invention claimed is:

1. A display element, comprising:
 a light valve section having a plurality of optical shutter means that switch between a transmitting state and a shading state of light emitted from a light emitting element; and a substrate through which light that exits said plurality of optical shutter means is transmitted; and
 a plasmon coupling section that is mounted on said substrate and arranged in said light valve section, and that causes plasmon coupling to occur with light that exits said light emitting element,
 wherein said plasmon coupling section includes:
 a carrier generation layer that is arranged on an incident-side of said plasmon coupling section and that generates carriers with light that exits said light emitting element, and
 a plasmon excitation layer that is arranged on the substrate-side of said plasmon coupling section and stacked above said carrier generation layer, and that has a higher plasma frequency than the frequency of light that is generated in said carrier generation layer excited with the light emitted from said light emitting element,
 wherein an exit layer is arranged on said substrate or between said substrate and said plasmon excitation layer so as to convert the light or surface plasmons generated in said plasmon excitation layer into light having a predetermined exit angle, and
 wherein said plasmon excitation layer is sandwiched between two layers having dielectric constants.

2. The display element according to claim 1, further comprising:
 a dielectric constant layer arranged adjacent to either or both of said exit layer side of said plasmon excitation layer and said carrier generation layer side of said plasmon excitation layer.

3. The display element according to claim 2,
 wherein said plasmon excitation layer is sandwiched between a pair of said dielectric constant layers, and
 wherein said dielectric constant layer adjacent to said carrier generation layer side of said plasmon excitation layer has a lower dielectric constant than said dielectric constant layer adjacent to said exit layer side of said plasmon excitation layer.

4. The display element according to claim 1,
 wherein the effective dielectric constant of an incident side portion including the entire structure stacked above said carrier generation layer side of said plasmon excitation layer of said plasmon coupling section and said substrate is lower than that of an exit side portion including an entire structure stacked above said exit layer side of said plasmon excitation layer, said exit layer, and a medium that makes contact with said exit layer or said substrate side.

5. The display element according to claim 2,
 wherein said plasmon excitation layer is sandwiched between a pair of said dielectric constant layers, and
 wherein said dielectric constant layer adjacent to said carrier generation layer side of said plasmon excitation layer has a higher dielectric constant than said dielectric constant layer adjacent to said exit layer side of said plasmon excitation layer.

6. The display element according to claim 1,
 wherein the effective dielectric constant of an incident side portion including the entire structure stacked above said carrier generation layer side of said plasmon excitation layer of said plasmon coupling section and said substrate is higher than that of the exit side portion including the entire structure stacked above said exit layer side of said plasmon excitation layer, said exit layer, and a medium that makes contact with said exit layer or said substrate side.

7. The display element according to claim 4,
 wherein said effective dielectric constant is determined based on a dielectric constant distribution of dielectrics in the incident side portion or the exit side portion and based on a distribution of a surface plasmon in the direction vertical to the interface of the plasmon excitation layer in the incident side portion or the exit side portion.

8. The display element according to claim 1,
 wherein said light valve section has a light conductor into which light emitted from said light emitting element enters, wherein said light conductor has a transmitting region through which light emitted from said light emitting element enters said plasmon coupling section, wherein the plasmon coupling section is arranged between said substrate and said light conductor, and wherein there is a gap between said light conductor and said plasmon coupling section.

9. The display element according to claim 8, wherein said plasmon coupling section is arranged opposite to said transmitting region.

10. The display element according to claim 1, wherein each of said plurality of optical shutter means includes:

a shutter member that switches between an open state and a closed state for the transmitting region through which light emitted from said light emitting element passes, and a drive mechanism that drives said shutter member.

11. The display element according to claim 1, wherein each of said plurality of optical shutter means includes:

said plasmon coupling section secured to said substrate, and a pair of electrodes that move said plasmon coupling section to a first position at which light emitted from said light emitting element passes through said substrate and a second position at which light emitted from said light emitting element does not pass through said substrate.

12. The display element according to claim 1, wherein said exit layer is made of photonic crystal.

13. The display element according to claim 1, wherein said plasmon excitation layer comprises red pixels, green pixels, and blue pixels, the red pixels being made of Au or an alloy containing Au as a primary component, the green pixels being made of Au, Ag, or an alloy containing Au or Ag as a primary component, the blue pixels being made of Ag or an alloy containing Ag as a primary component.

14. A display device, comprising:

a display element according to claim 1; and at least one light emitting element.

15. A projection display device, comprising:

a display device according to claim 14; and a projection optical system that projects a projection image with light that exits said display device.

* * * * *